(12) United States Patent
McKinney

(10) Patent No.: US 10,501,357 B1
(45) Date of Patent: Dec. 10, 2019

(54) MOBILE WASTEWATER TREATMENT SYSTEM

(71) Applicant: Jerry L. McKinney, Silsbee, TX (US)

(72) Inventor: Jerry L. McKinney, Silsbee, TX (US)

(*) Notice: Subject to any disclaimer, the term of this patent is extended or adjusted under 35 U.S.C. 154(b) by 222 days.

(21) Appl. No.: 15/814,968

(22) Filed: Nov. 16, 2017

Related U.S. Application Data

(60) Provisional application No. 62/422,855, filed on Nov. 16, 2016.

(51) Int. Cl.
| | |
|---|---|
| *C02F 9/00* | (2006.01) |
| *B01D 21/02* | (2006.01) |
| *E03B 1/04* | (2006.01) |
| *C02F 3/02* | (2006.01) |
| *C02F 103/00* | (2006.01) |

(52) U.S. Cl.
CPC .............. *C02F 9/005* (2013.01); *B01D 21/02* (2013.01); *C02F 3/02* (2013.01); *E03B 1/048* (2013.01); *C02F 2103/005* (2013.01); *C02F 2201/008* (2013.01); *C02F 2201/32* (2013.01)

(58) Field of Classification Search
CPC .. C02F 2201/008; C02F 9/00; C02F 2209/42; C02F 3/1247; C02F 3/02; B01D 21/02; B01D 21/2444; B01D 21/0003; B01D 21/003

USPC ......................................... 210/85, 195.1, 620
See application file for complete search history.

(56) References Cited

U.S. PATENT DOCUMENTS

| | | | |
|---|---|---|---|
| 7,149,701 B2 | 12/2006 | McKinney | |
| 7,525,420 B2 | 4/2009 | McKinney | |
| 7,945,471 B2 | 5/2011 | McKinney et al. | |
| 8,386,303 B2 | 2/2013 | McKinney | |
| 9,499,412 B1 | 11/2016 | McKinney | |
| 2004/0211722 A1* | 10/2004 | Lacey ..................... | C02F 3/085 210/620 |
| 2005/0021359 A1 | 1/2005 | McKinney | |
| 2007/0021971 A1 | 1/2007 | McKinney et al. | |
| 2007/0102335 A1* | 5/2007 | McKinney .............. | C02F 3/302 210/194 |
| 2007/0106525 A1 | 5/2007 | McKinney | |
| 2012/0285895 A1* | 11/2012 | Smiddy .................. | C02F 1/56 210/724 |
| 2015/0100169 A1 | 4/2015 | McKinney | |

* cited by examiner

Primary Examiner — Claire A Norris
(74) Attorney, Agent, or Firm — Bushman Werner, P.C.

(57) ABSTRACT

A mobile wastewater treatment system wherein a mobile carrier has mounted thereon a wastewater treatment plant. The wastewater treatment plant has a flow equalization tank, an aeration tank, a clarifying tank, a disinfection stage, and a pumping tank. The mobile carrier can be a trailer, a skid, a shipping container, or the like.

15 Claims, 5 Drawing Sheets

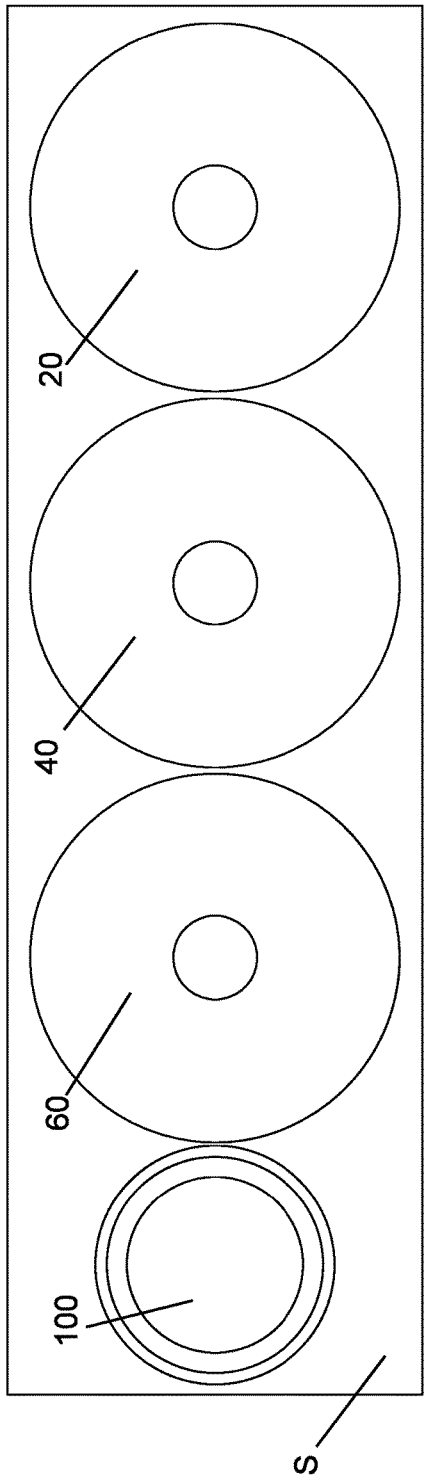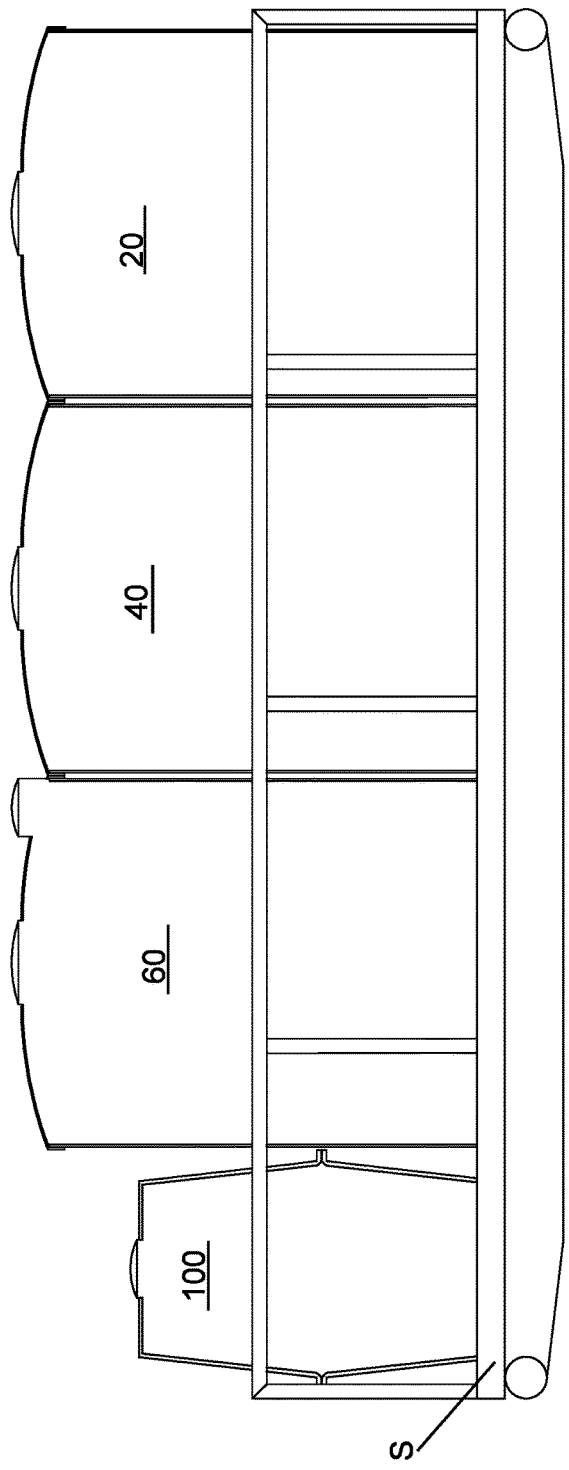
Fig. 4A
Fig. 4B

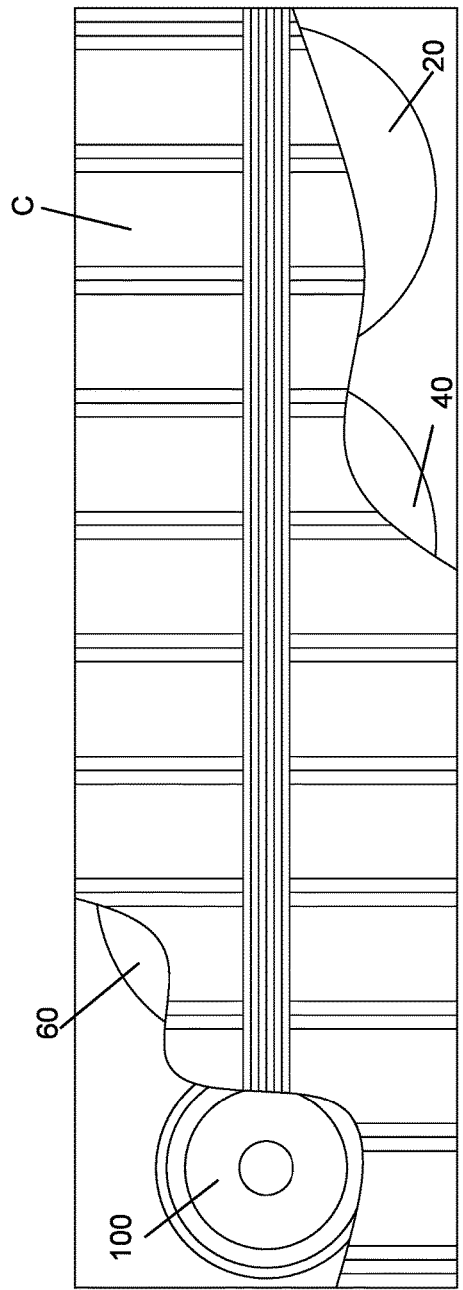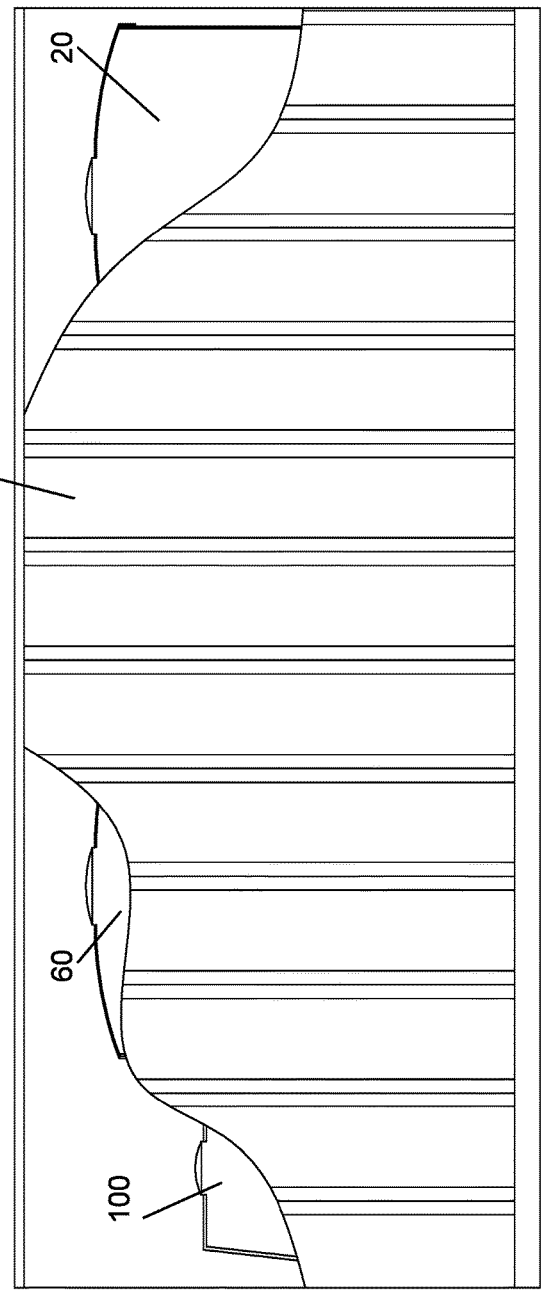

MOBILE WASTEWATER TREATMENT SYSTEM

CROSS REFERENCE TO RELATED APPLICATION

This application claims priority to U.S. Application No. 62/422,855 filed on Nov. 16, 2016, the disclosure of which is incorporated herein by reference for all purposes.

FIELD OF THE INVENTION

The present invention relates to a mobile wastewater treatment system. In particular, the present invention relates to a wastewater treatment system which can be carried and/or transported on a carrier such as a trailer, skid, intermodal shipping container, or the like.

BACKGROUND OF THE INVENTION

Many oil/gas drilling companies offer workforce housing to employees at remote oilfield locations. Rather than travel long distances daily to reach the remote location, the employees live in temporary developments near the location. One requirement for such housing arrangements is on-site environmentally acceptable disposal of the human-generated wastewater from laundry, dishwashing, and showers (gray water) as well as that from toilets (black water). Wastewater, which includes human waste, cannot simply be disposed of on-site and must either be treated prior to disposal or hauled away for treatment and disposal elsewhere. Hauling away wastewater is costly and time consuming but oilfield companies are also reluctant to dedicate capital to a permanent on-site treatment plant.

The present invention provides a mobile wastewater treatment system which can be temporarily installed at an oilfield site. The system of the present invention treats the wastewater such that its meets requirements of regulatory agencies to be disposed of on-site. On-site disposal can be accomplished by spray irrigation, pumping the water downhole, or pumping it into a mud pit. The system of the present invention can be carried on a trailer, a skid, or in a typical intermodal shipping container. The system of the present invention provides a wastewater treatment system which can be easily transported to various sites as needed.

SUMMARY OF THE INVENTION

In one aspect the present invention provides a mobile wastewater treatment system.

In another aspect, the present invention provides a wastewater treatment system which can be mounted on a mobile carrier for easy transport between locations.

In yet another aspect, the present invention provides a wastewater treatment system with flow equalization.

In still a further aspect, the present invention provides a method of treating wastewater with a mobile wastewater treatment system.

These and further features and advantages of the present invention will become apparent from the following detailed description, wherein reference is made to the figures in the accompanying drawings.

BRIEF DESCRIPTION OF THE DRAWINGS

FIG. 4A is a top plan view of the system of FIG. 1 mounted on a skid.

FIG. 4B is a side elevational view of the system of FIG. 4A.

FIG. 5A is a top plan view, partially cut away, of the system of FIG. 1 disposed within an intermodal container.

FIG. 5B is a side elevational view, partially cut away, of the system of FIG. 5A.

DETAILED DESCRIPTION OF PREFERRED EMBODIMENTS

Figure 1:
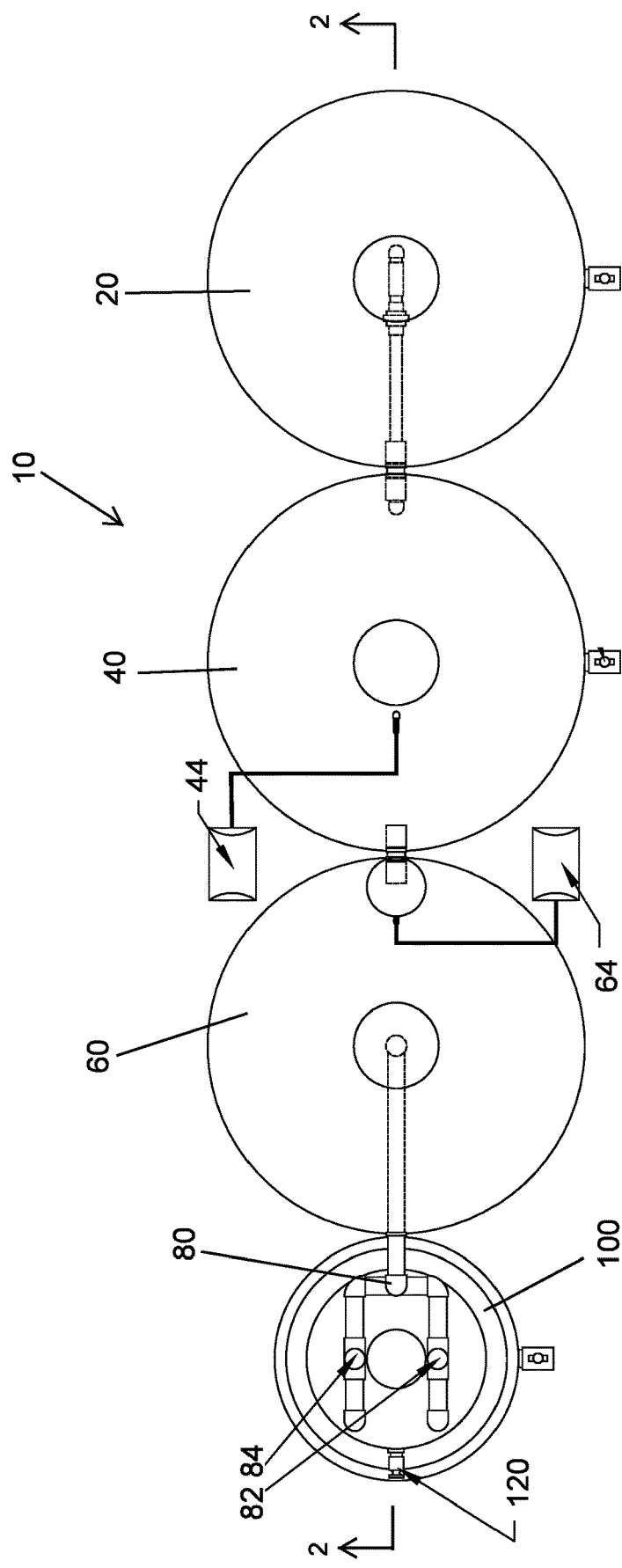
FIG. 1 is a top plan view of one embodiment of the system of the present invention.
Figure 2:
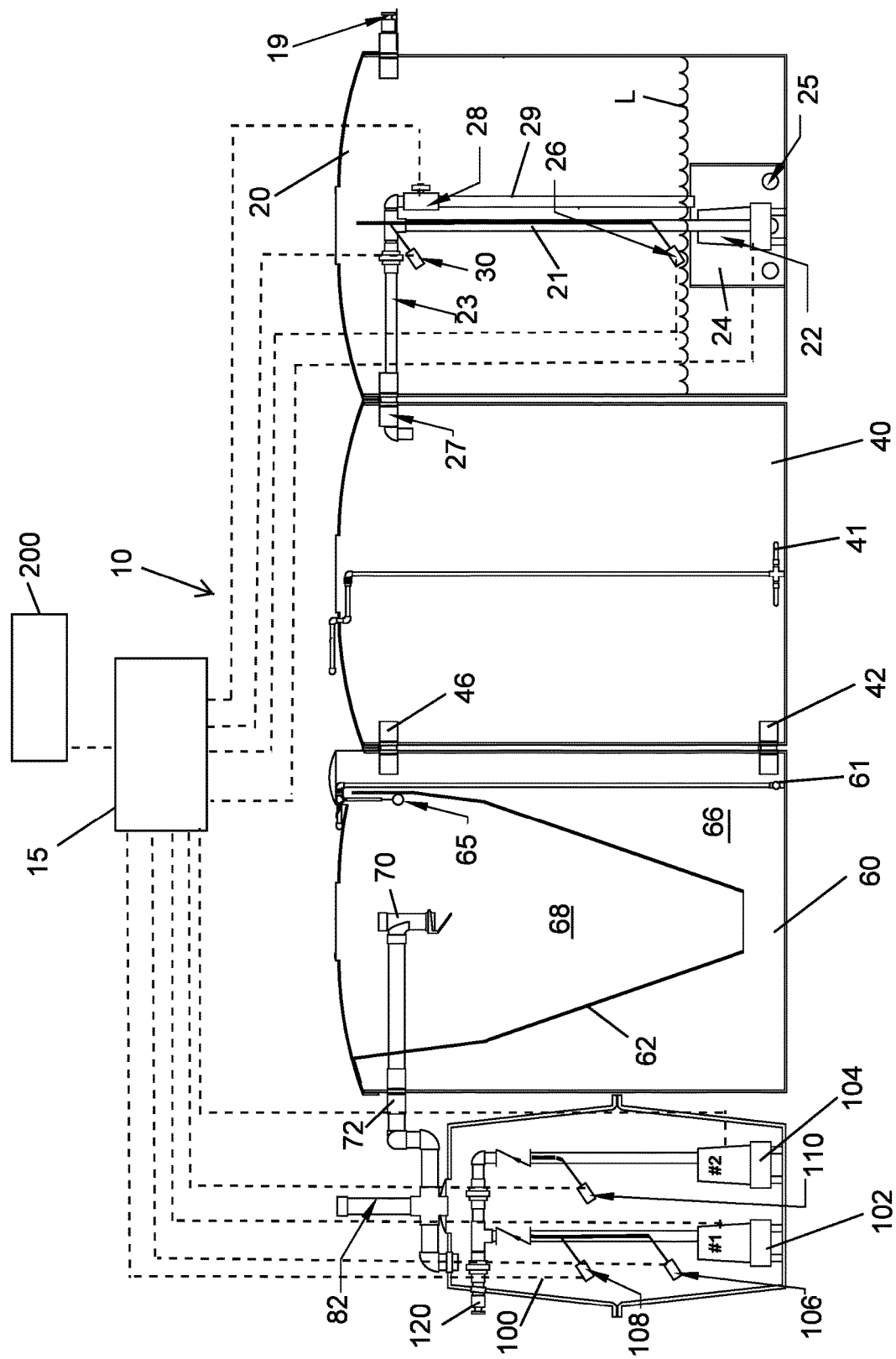
FIG. 2 is a sectional side elevational view of the system of FIG. 1 taken along the lines 2-2 of FIG. 1.

The system 10 shown in FIGS. 1 and 2 comprises an aerobic wastewater treatment plant having a settling/flow equalization tank 20, an aeration tank 40, a clarifying tank 60, a disinfection apparatus 80, and a pump tank 100.

Referring now to FIG. 2, the detailed aspects of the system shown in FIG. 1 are shown more fully. As is well known to those skilled in the art, in aerobic wastewater treatment plants such as shown in FIGS. 1 and 2, settling tank 20 allows undigestable solids to settle out and later be removed. Wastewater from a source, e.g., a bathroom fixture, enters settling tank 20 via inlet 19. It will be appreciated that the wastewater can come from a single source or several sources each having sump pumps or the like which pump ultimately into the inlet 21.

There is a wastewater pump wastewater pump 22 disposed in settling tank 20 which pumps water through lines 21 and 23 and into aeration tank 40. Wastewater pump 22 can be a solids handling pump, a grinder pump, or any other pump capable of pumping wastewater including solids. Line 23 passes through pipe 27 which provides open communication between settling tank 20 and aeration tank 40. In a preferred embodiment, wastewater pump 22 is positioned within a shroud 24 which has openings 25 to allow passage of water through shroud 24 to wastewater pump 22. Preferably, shroud 24 is affixed to the bottom of settling tank 20 and serves to prevent wastewater pump 22 from shifting during transport of the system 10. Wastewater pump 22 is connected to controller 15 which supplies power and controls pump 22. It will be understood that all pumps, switches, alarms, and the like will be operatively connected to at least one controller 15 which supplies power and controls the operation of the pumps, switches, alarms, etc. Wastewater pump 22 is programmed to pump in cycles, the length of which can be determined by the needs of the particular site. It is desired to maintain a certain minimum amount of water, shown as surface level L, in settling tank 20 to ensure both that when wastewater pump 22 turns on there is sufficient water in the tank but also to allow the layer of scum and/or grease which tends to accumulate on the surface L in settling tank 20 to remain above the intake of wastewater pump 22. Thus, low level switch 26, also connected to controller 15, ensures that wastewater pump 22 shuts off when the water level reaches a certain low point in settling tank 20.

Flow control valve 28 in settling tank 20 controls the flow of the water being pumped into aeration tank 40. When flow control valve 28 is closed, all wastewater pumped by wastewater pump 22 passes through line 23 into aeration tank 40. When flow control valve 28 is open, a portion of the wastewater pumped by wastewater pump 22 passes through flow control valve 28, return line 29, and back into settling tank 20. The flow control valve 28 may be connected to controller 15 and can be throttled to provide lesser or greater flow, respectively, of wastewater in to aeration tank 40.

There is a high level float alarm 30 in settling tank 20 which is connected to controller 15 and alerts the user that settling tank 20 is full. In a preferred embodiment, pipe 27 which connects settling tank 20 to aeration tank 40 has an inner diameter larger than the outer diameter of line 23 such that pipe 27 can act as a gravity overflow from settling tank 20 into aeration tank 40. If wastewater in settling tank 20 reaches the level of pipe 27, it can flow by gravity into aeration tank 40. If needed, the user can reprogram the pump cycles to empty settling tank 20 quicker and/or adjust the flow control valve 28 to increase the flow rate into aeration tank 40 to prevent high level alerts. In another embodiment, high level float alarm 30 may also act as a switch which controls wastewater pump 22 such that when the wastewater reaches high level float 30, wastewater pump 22 is turned on to pump water out of tank 20.

It will be appreciated that the settling tank 20 acts as a flow equalization tank as well as a settling tank. The rate of water usage at oilfield sites varies and has peak hours as when the workers come off shift and proceed to wash off and perform chores which use water, e.g., laundry, dish washing, etc., and low hours when workers are on shift or sleeping. The system of the present invention equalizes flow of wastewater being treated so that a consistent rate of treatment occurs, regardless of whether it is a peak usage hour. This is accomplished, in part, by the wastewater pump 22 which operates in cycles and the flow control valve 28 which controls the flow of wastewater to aeration tank 40. Wastewater pump 22 will be programmed by the controller 15 to pump in cycles for a certain amount of time or for a certain volume of wastewater, based on the needs of the site. When water usage on-site is high, increased amounts of wastewater will be sent to the system 10 of the present invention. The wastewater pump 22 only pumps the amount of wastewater out according to its programmed cycle. Thus, while the usage of wastewater by the workers on site my increase or decrease at certain times of the day, the flow of wastewater through system 10 is controlled and equalized to provide substantially continuous treatment of wastewater, regardless of the usage rate. The flow control valve 28 and the wastewater pump 22 can be set to control the treatment at an appropriate rate based on the water usage of the particular site.

Wastewater pumped from settling tank 20 enters aeration tank 40. Pipe 42 provides open communication between aeration tank 40 and clarifying tank 60. As seen in FIG. 2, pipe 42 is disposed proximal the bottom walls of aeration tank 40 and clarifying tank 60, but it will be understood that pipe 42 could be positioned at a higher level if so desired. As shown in FIG. 2, wastewater flowing into aeration tank 40 proceeds to flow into clarifying tank 60 via pipe 42, keeping the level of wastewater in both tanks approximately the same. There is also a gravity overflow pipe 46 interconnecting the interior of aeration tank 40 and clarifying tank 60. There is a high level alarm 65 within clarifying tank 60 which alerts the system user that clarifying tank 60 and aeration tank 40 are full.

As is well known, a typical aerobic treatment tank has a frustoconical partition which divides the aerobic treatment tank into an aerobic treatment chamber and a clarifier chamber. In the present system, aeration tank 40 has no clarifier portion, i.e., it is simply an aeration vessel. Rather clarifying tank 60 has a frustoconical partition 66 which divides the tank 60 into an aerobic treatment chamber 66 and a clarifier chamber 68. Aerators 44 and 64 (seen in FIG. 1) pump a source of oxygen, e.g., air, into aeration tank 40 and aerobic treatment chamber 66 via aerators 41 and 61, respectively, whereby undigested solids carried over from settling tank 20 are aerobically digested.

By including aeration tank 40 in addition to clarifying tank 60 the system 10 increases the exposure of the wastewater to aerobic digestion. The longer the time spent in aerobic digestion, the cleaner the water. Without the separate aeration tank 40, the aerobic treatment chamber 66 in clarifying tank 60 would be the sole source of aerobic digestion and as such, clarifying tank 60 would need to be significantly larger in volume, such that it could no longer fit on a carrier. The increased exposure to aerobic digestion provided in aeration tank 40 means a larger volume of water can be treated in a smaller overall footprint and contributes to the mobility of the system as a whole.

Depending on the needs of the user, two clarifying tanks 60 may be employed rather than the aeration tank 40 and clarifying tank 60 shown in FIG. 2. Additionally, it will be appreciated that an existing aeration tank 40 may be converted to a clarifying tank by the addition of a frustoconical partition and appropriate placement of the aerator. Such alternative configurations, i.e., having two clarifying tanks, would be able to handle a larger volume of wastewater than a system having a single clarifying tank alone with no aeration tank, but not as much volume as the embodiment shown in FIG. 2.

Returning to FIG. 2, clarifier chamber 68 acts to allow any undigested solids to settle out back into aerobic treatment chamber 66 for further digestion. Substantially clarified water is removed from clarifier chamber 68 via gravity overflow 70 and passes via line 72 into disinfectant apparatus 80.

Disinfectant apparatus 80 comprises dual tablet chlorinators 82 and 84, as shown in FIG. 1, of a type well known to those of skill in the art. The tablet chlorinators 82 and 84 chlorinate the wastewater and kill microbes/bacteria therein. The substantially clarified water flows from clarifier chamber 68 through tablet chlorinators 82 and 84 and enters pump tank 100 as treated wastewater. It will be appreciated that the system of the present invention can include any number of tablet chlorinators consistent with size constraints. It will also be appreciated that while the drawings show tablet chlorinators for disinfection, the scope of the invention is not so limited. Alternative means of disinfection such as UV light connected to a controller, e.g., controller 15, liquid chlorinators, or combinations thereof can be incorporated in the disinfection apparatus 80 of the present invention.

Pump tank 100 holds two pumps 102 and 104. Pump 102 is the primary pump and pumps the treated wastewater out of pump tank 100 through outlet 120 to the on-site disposal location of the water. Float switch 106 is connected to pump 102 and is operative to turn pump 102 on or off when the water level goes above or below float switch 106, respectively. High level float alarm 108 is connected to pump 102. High level float switch 110 is operatively connected to secondary pump 104. In a preferred embodiment, high level alarm 108 and high level float switch 110 are disposed at approximately the same level. If the water in pump tank 100 reaches high level alarm 108/high level switch 110, high level alarm 108 will alert the system user that the pump tank 100 is full, and high level switch 110 will operate to turn on secondary pump 104. Thus, secondary pump 104 is only activated when the water level in pump tank 100 becomes too high. It will be appreciated that the high level alarm 108 and the high level switch 110 which activates secondary pump 104 can be combined into a single float level switch.

The use of two pumps in pump tank 100 provides several advantages. If the flow rate of the water is more than primary pump 102 can handle, the water level will rise and secondary pump 104 is activated. If primary pump 102 ceases to operate, the water level will rise, secondary pump 104 will be activated, and the system of the present invention will continue to operate until the primary pump 102 can be repaired.

In an alternative embodiment, pumps 102 and 104 can be programmed to operate in alternating cycles. Thus, pump 102 will pump wastewater out for one cycle (a cycle being determined by volume of wastewater or amount of time as determined by user needs), then pump 104 will pump wastewater out for the next cycle. By alternating pumps, the wear and tear is spread over a longer time and each pump can last longer than a single pump pumping for every cycle. In this embodiment, the high level switches 108, 110 will trigger the pump not in use to come on whereby both pumps operate at the same time until the wastewater level drops again.

Figure 3A:
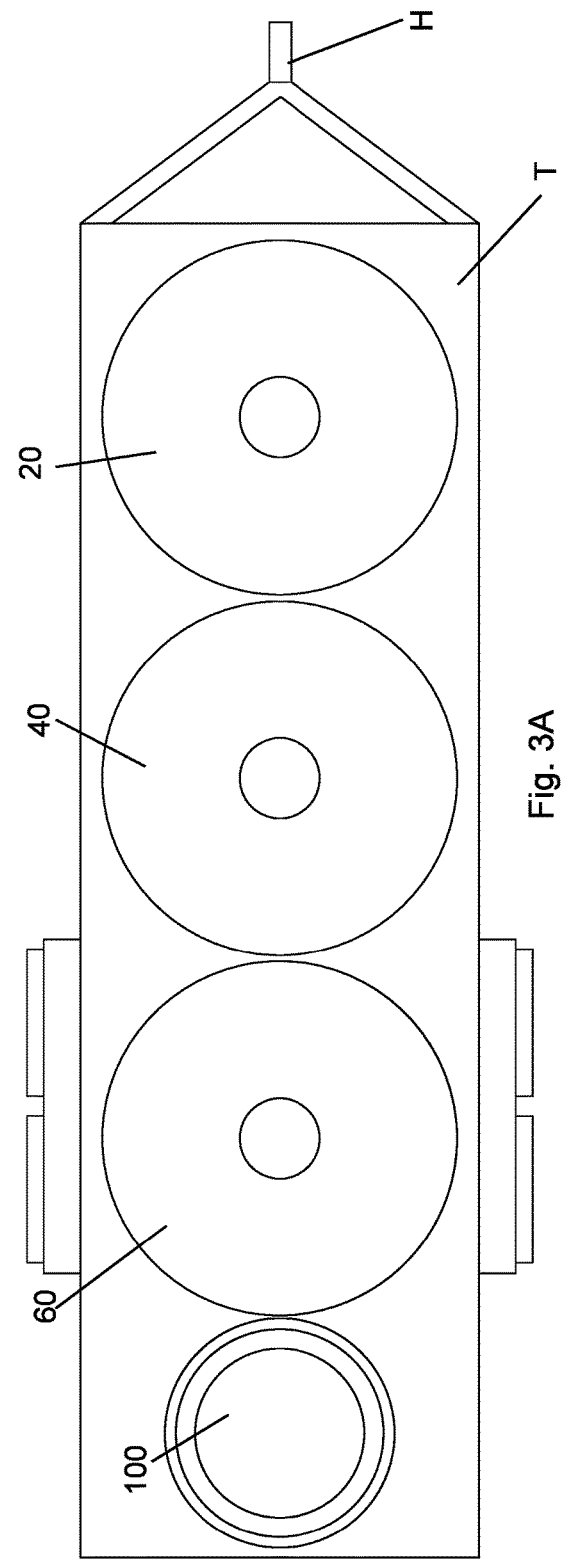
FIG. 3A is a top plan view of the system of FIG. 1 mounted on a carrier, e.g., a trailer.
Figure 3B:
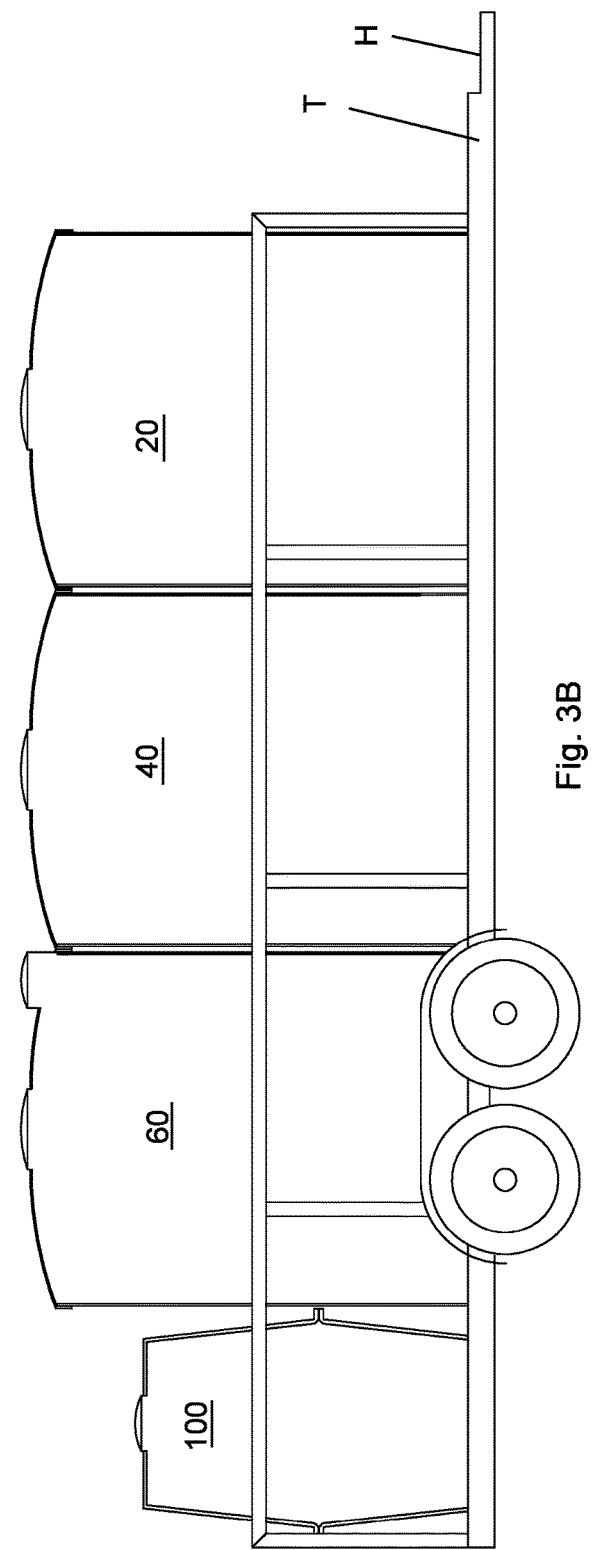
FIG. 3B is a side elevational view of the system of FIG. 3A.

Turning to FIGS. 3A and 3B, there is shown the system 10 of the present invention mounted on a wheeled trailer T having tongue H for connection to a trailer hitch.

FIGS. 4A and 4B show the four tanks of system 10 of the present invention mounted on a skid S which can be carried on a truck or trailer to the well site.

FIGS. 5A and 5B show the four tanks of system 10 of the present invention disposed within a shipping/cargo container C, i.e., an intermodal container.

In a preferred embodiment, the system 10 of the present invention includes a remote wastewater monitoring/management system 200 as shown in FIG. 2. Such a monitoring system is operatively connected to the pumps, float switches, alarms, etc. described herein. Upon activation of an alarm, the monitoring system will send an alert to the user's cell phone, email, or other chosen means of notification of the problem so it can be addressed immediately. The preferred monitoring system includes a pump counter operatively connected to the pump(s) of the system that will monitor the pump cycles and calculate the amount of wastewater discharged. This feature is particularly advantageous in areas where government regulatory agencies require such discharge records be kept. Examples of the remote monitoring/management system contemplated can be found in U.S. Pat. Nos. 7,149,701; 7,945,471; 7,525,420; 8,386,303; 9,499,412 and U.S. Patent Publications 2005/0021359; 2007/0021971; 2007/0106525; and 2015/0100169, all of which are incorporated herein by reference for all purposes.

Although specific embodiments of the invention have been described herein in some detail, this has been done solely for the purposes of explaining the various aspects of the invention, and is not intended to limit the scope of the invention as defined in the claims which follow. Those skilled in the art will understand that the embodiment shown and described is exemplary, and various other substitutions, alterations and modifications, including but not limited to those design alternatives specifically discussed herein, may be made in the practice of the invention without departing from its scope.

What is claimed is:

1. A mobile wastewater treatment system, comprising:
   a carrier;
   a wastewater treatment plant mounted on said carrier and having an input and an output, said wastewater treatment plant comprising:
   a settling tank in open communication with said input for receiving wastewater;
   a wastewater pump, having an inlet and an outlet, disposed in said settling tank, said wastewater pump being operative to pump wastewater in cycles;
   an aeration tank having an inlet connected to said outlet of said wastewater pump;
   a flow control valve disposed in said settling tank and operative to control the flow of said wastewater pumped by said wastewater pump into said aeration tank;
   a clarifying tank in open communication with said aeration tank, said clarifying tank having an aerobic treatment chamber and a clarifying chamber, said clarifying chamber having a gravity flow outlet;
   a disinfection apparatus having an inlet connected to said gravity flow outlet of said clarifying chamber, and an outlet; and
   a pump tank connected to said outlet of said disinfection apparatus;
   a first pump disposed in said pump tank for pumping treated wastewater through said output of said wastewater treatment plant.

2. The system of claim 1, further comprising a high level alarm disposed in said settling tank, said high level alarm sending a signal if the wastewater reaches a certain level within said settling tank.

3. The system of claim 2, wherein said high level alarm comprises a switch operatively connected to said wastewater pump to turn said wastewater pump on when said high level alarm is triggered.

4. The system of claim 1, further comprising a low level switch disposed in said settling tank and operative to turn said wastewater pump off when said wastewater drops down to a certain level.

5. The system of claim 1, further comprising a gravity overflow between said settling tank and said aeration tank.

6. The system of claim 1, further comprising a gravity overflow between said aeration tank and said clarifying tank.

7. The system of claim 1, further comprising at least one aerator operative to supply air to said aeration and clarifying tanks.

8. The system of claim 1, further comprising a plurality of aerators, each of said aerators operative to supply air to one of said aeration and clarifying tanks, respectively.

9. The system of claim 1, wherein said clarifying chamber is formed by an frustoconical partition disposed in said clarifying tank.

10. The system of claim 1, wherein said disinfection apparatus comprises at least one of tablet chlorinators, liquid chlorinators, and UV light disinfection systems.

11. The system of claim 1, wherein said disinfection apparatus comprises tablet chlorinators.

12. The system of claim 1, wherein there is a second pump disposed in said pump tank for pumping treated wastewater through said output of said wastewater treatment plant.

13. The system of claim 12, further comprising a high level switch disposed in said pump tank and operative to control said second pump, whereby said first pump pumps treated wastewater every cycle and said second pump only pumps wastewater in response to said high level switch.

14. The system of claim 12, wherein said first and second pumps operate in alternating cycles.

15. The system of claim 1, wherein said carrier is selected from the group consisting of a trailer, a skid, and a shipping container.

\* \* \* \* \*